United States Patent
Tu et al.

(10) Patent No.: US 7,444,715 B2
(45) Date of Patent: Nov. 4, 2008

(54) HINGE MECHANISM FOR FOLDABLE ELECTRONIC DEVICE

(75) Inventors: Ying-Liang Tu, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 256 days.

(21) Appl. No.: 11/384,468

(22) Filed: Mar. 20, 2006

(65) Prior Publication Data

US 2006/0242793 A1  Nov. 2, 2006

(30) Foreign Application Priority Data

Apr. 29, 2005 (CN) .......................... 2005 1 0034513

(51) Int. Cl.
*E05F 1/14* (2006.01)
(52) U.S. Cl. .......................................... 16/284; 16/277
(58) Field of Classification Search .................. 16/284, 16/221, 224, 277, 255, 330, 303, 313, 275, 16/333, 343, 366; 361/680, 683, 814; 455/575.1, 455/575.3, 575.4, 575.8, 550.1, 90.3; 379/433.12, 379/433.13; 348/373, 333.06, 794; 403/149, 403/146, 115, 125, 150, 151, 56, 76, 90
See application file for complete search history.

(56) References Cited

U.S. PATENT DOCUMENTS

| | | | | |
|---|---|---|---|---|
| 6,148,480 A * | 11/2000 | Cooke | ..................... | 16/303 |
| 6,402,270 B1 * | 6/2002 | Frank | ..................... | 312/138.1 |
| 6,578,593 B2 * | 6/2003 | Leonarz | ..................... | 135/20.1 |
| 6,728,557 B1 * | 4/2004 | Tracy et al. | ..................... | 455/575.3 |
| 7,118,601 B2 * | 10/2006 | Yasui et al. | ..................... | 623/24 |
| 7,237,892 B2 * | 7/2007 | Curci et al. | ..................... | 351/153 |
| 2004/0040805 A1 * | 3/2004 | Bailey | ..................... | 188/267.2 |

* cited by examiner

*Primary Examiner*—Victor Batson
*Assistant Examiner*—Matthew Sullivan
(74) *Attorney, Agent, or Firm*—Andrew C. Cheng

(57) ABSTRACT

A hinge mechanism includes a fixed member (20), two rolling elements (40), an elastic member (60), a rotational member (50) and a shaft (30). The fixed member has a flange (201) and a stop portion (202) thereof. Two first hollows (2022) are defined in the end part of the flange. Each rolling element has two rolling portions (402, 403). The rotational member includes a main portion (51) defined two hemisphere second hollows (511), and a middle portion (53) defining two receiving chambers (531) therein for receiving the rolling bodies. The first and second rolling portions of each rolling element are respectively received in the first hollow and the second hollow. The shaft extends through the fixed member, the elastic member and the rotational member. One end of the elastic member resists the rotational member and the other end of the elastic member is fixed in the longitudinal direction of the shaft.

20 Claims, 8 Drawing Sheets

HINGE MECHANISM FOR FOLDABLE ELECTRONIC DEVICE

BACKGROUND OF THE INVENTION

1. Field of the Invention

The present invention generally relates to hinge mechanisms and, more particularly, to a hinge mechanism for hinging together housings of a foldable, portable electronic device such as a mobile phone or a PDA (Personal Digital Assistant).

2. Discussion of the Related Art

Portable mobile phones generally have two housings rotatably joined by a type of hinge that allows the housings to fold upon one another. Many such foldable mobile phones have most of the electronics in one housing, called the main housing, and fewer electronics in the other housing, called the cover. Other such foldable mobile phones have all the electronics in the main housing, with the cover serving only to cover a keypad and a display of the main housing. The main housing and the cover are connected together by a hinge mechanism. Generally, the opening or closing of most covers is achieved by means of a cam mechanism and a spring in the hinge mechanism.

A typical hinge mechanism for a foldable mobile phone includes a shaft, an elastic member, a cam and a cam follower. The cam and the cam follower each have a cam surface attached to the other. The cam, the cam follower and the elastic member surround the shaft. The elastic member pushes directly against the cam. The cam follower matches (i.e., mates and operatively connects) with a main housing of the portable mobile phone. In a similar fashion, the cam matches with a cover. When opening the cover, the cam rotates together with the cover, and it rotates relative to the elastic member and the cam follower. Therefore, a large friction exists between the cam and the elastic member.

It can be seen that, a lot of energy is wasted via friction in the above-described hinge mechanism. In addition, it is difficult to open the cover smoothly because of the substantial degree of friction. Further, the friction will result in abrasion, which will shorten the useful lifetime of the hinge mechanism and eventually make the hinge mechanism perform in an unstable manner. Moreover, the cam surfaces of the cam and the cam follower are difficult to manufacture.

What is needed, therefore, is a hinge mechanism which can have a relatively long working lifetime, and which is stable and energy efficient to use and easy to manufacture.

SUMMARY OF THE INVENTION

In a preferred embodiment, a hinge mechanism includes a fixed member, two rolling bodies, an elastic member, a rotational member and a shaft. The fixed member has a flange and a stop portion thereof. Two first hollows are defined in the end part of the flange. Each rolling element has two rolling portions, first rolling portion and second rolling portion. The rotational member includes a main portion defining two hemispheric second hollows, and a middle portion defining two receiving chambers therein for receiving the rolling bodies. The two rolling portions (first rolling portion and second rolling portion) of each rolling element are received in their respective hollows (first hollow and the second hollow). The shaft extends through the fixed member, the elastic member and the rotational member. One end of the elastic member resists the rotational member and the other end is fixed in the longitudinal direction of the shaft.

Other advantages and novel features of preferred embodiments of the present hinge system and its applications will become more apparent from the following detailed description when taken in conjunction with the accompanying drawings.

BRIEF DESCRIPTION OF THE DRAWINGS

Many aspects of the present hinge mechanisms and their applications can be better understood with reference to the following drawings. The components in the drawings are not necessarily to scale, the emphasis instead being placed upon clearly illustrating the principles of the hinge mechanisms. Moreover, in the drawings, like reference numerals designate corresponding parts throughout the several views.

DETAILED DESCRIPTION OF PREFERRED EMBODIMENTS

Figure 1:
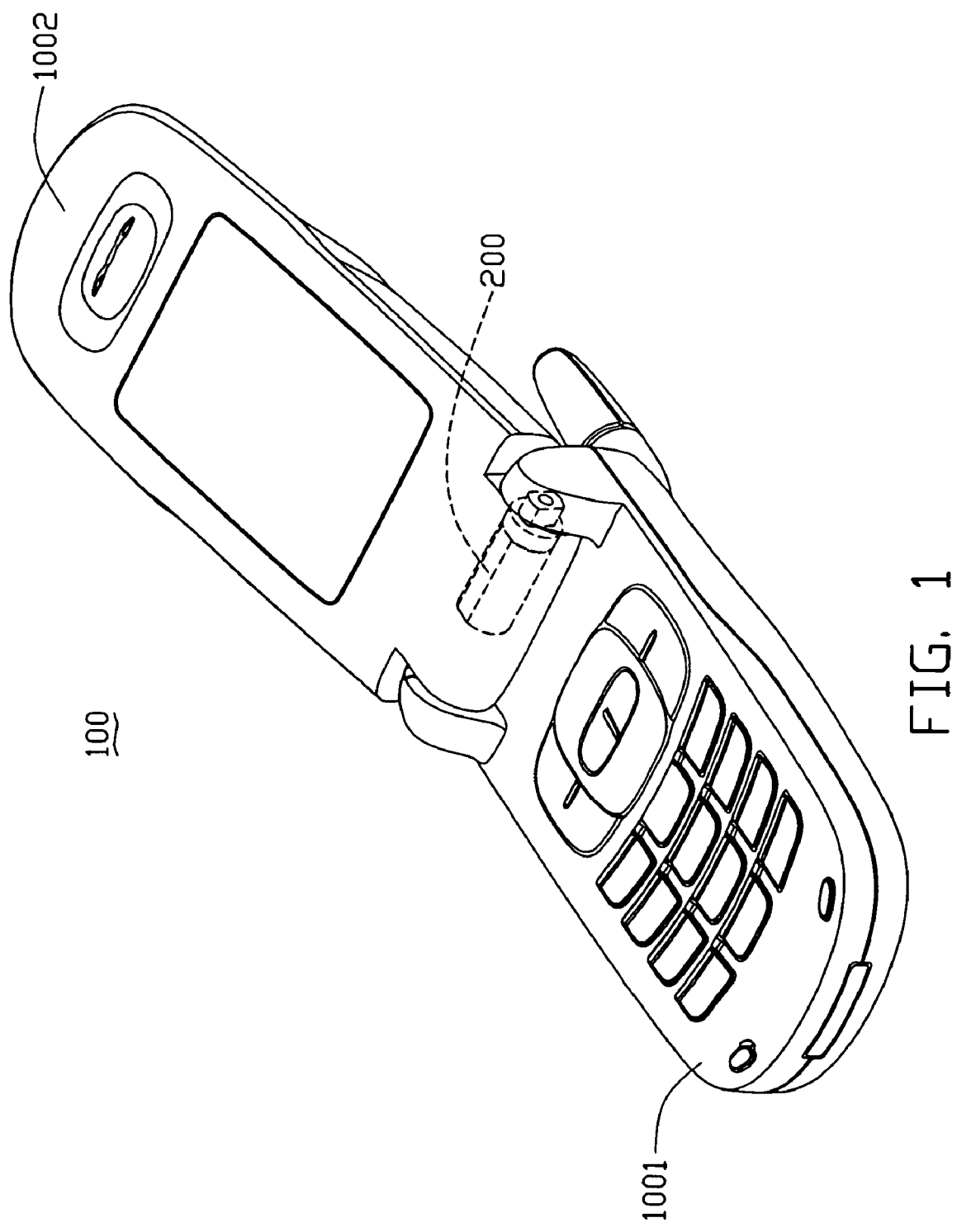
FIG. 1 is an isometric view of a flip type mobile phone including a cover, a main body, and a hinge mechanism according to a first preferred embodiment of the present invention, the hinge mechanism being shown with dashed lines.

Referring now to the drawings, FIG. 1 shows an electronic device like a flip type mobile phone 100, which includes a hinge mechanism 200 according to a first preferred embodiment of the present invention. The mobile phone 100 has a main body 1001 and a cover 1002. The main body 1001 and the cover 1002 are pivotally connected to each other via the hinge mechanism 200. It should be noted that hinge mechanism 200 can be used to interconnect components like a main body and a cover of any of a whole range of different kinds of foldable devices other than the mobile phone 100.

Figure 2:
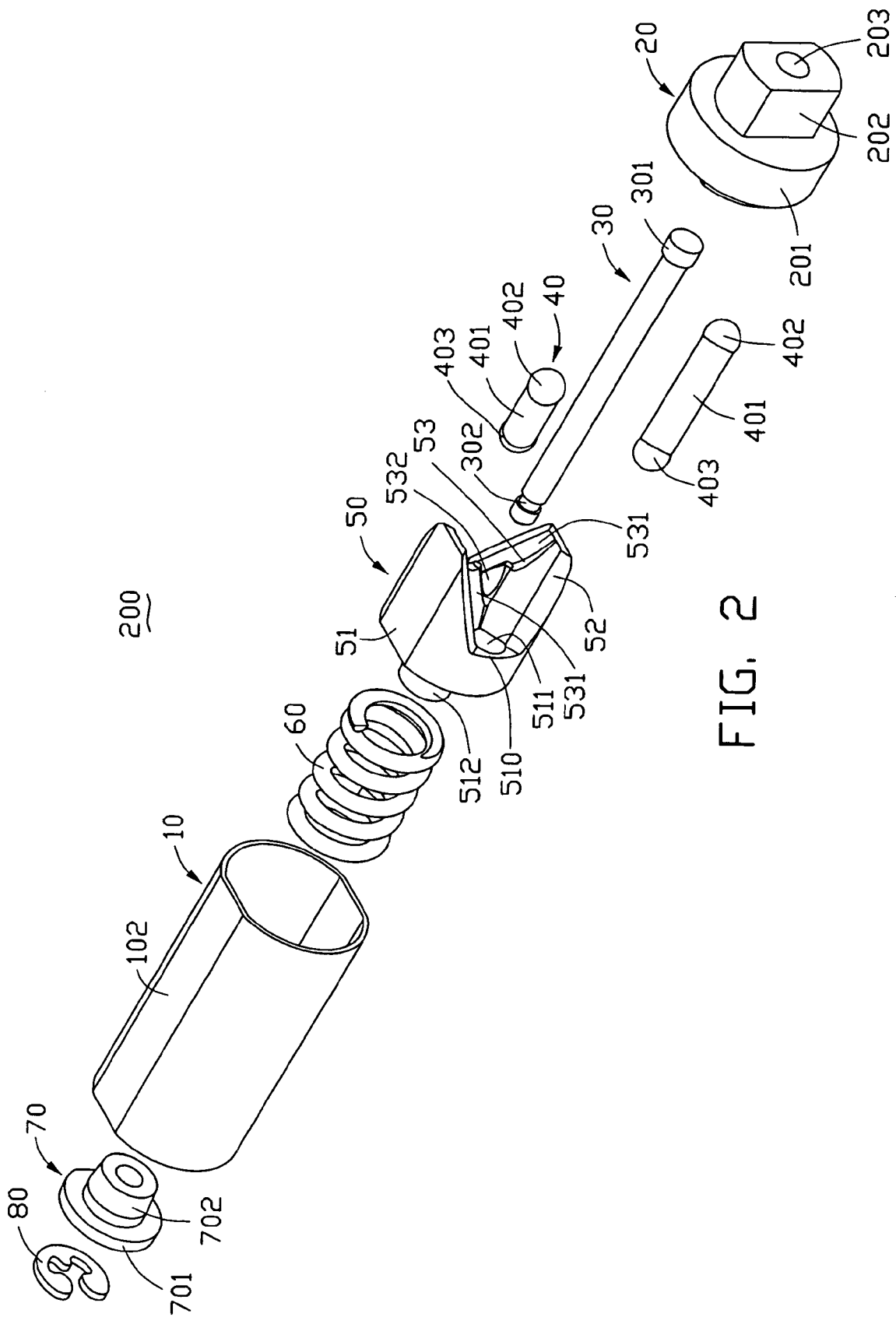
FIG. 2 is an exploded, isometric view of the hinge mechanism in FIG. 1.
Figure 3:
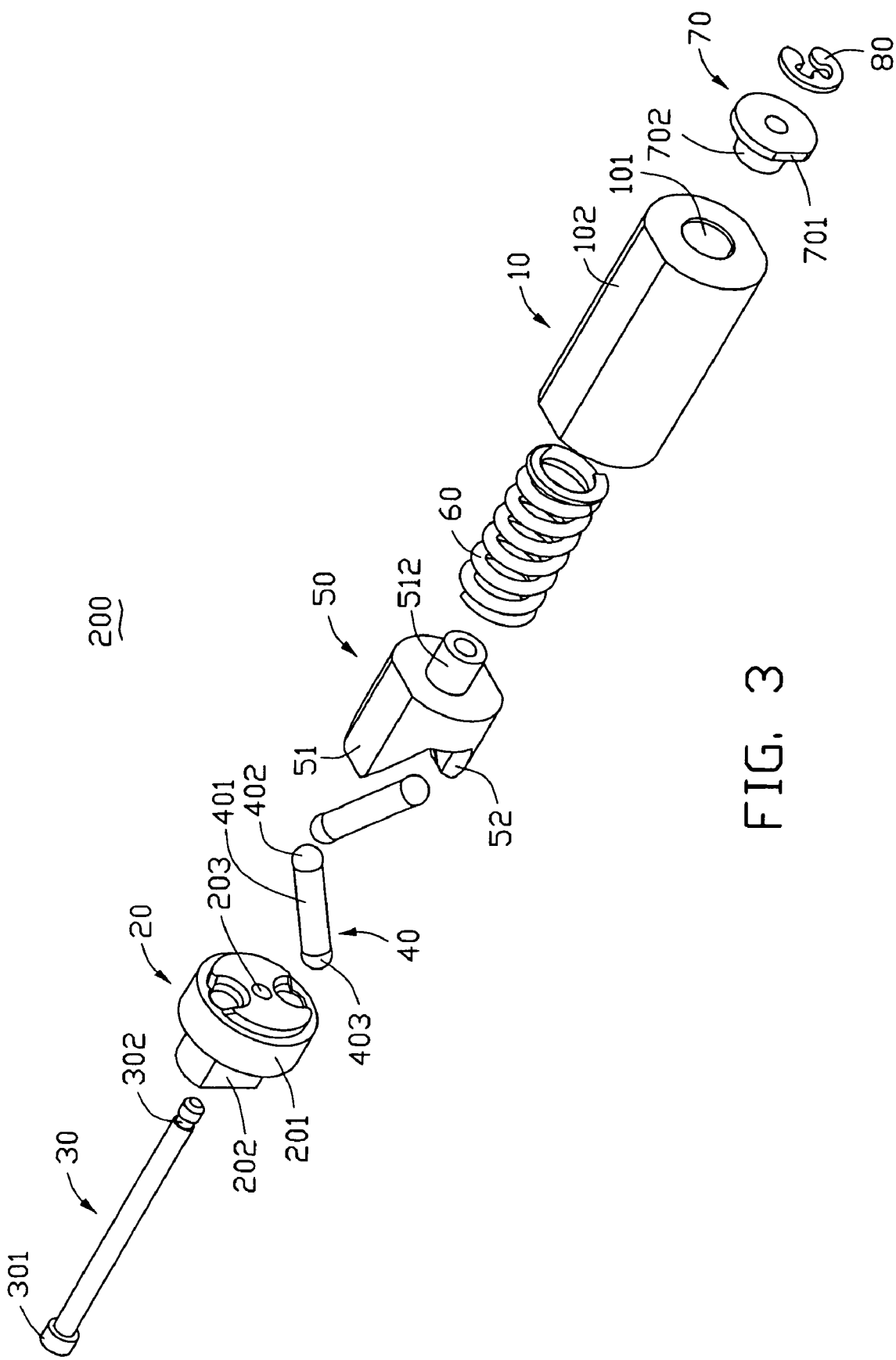
FIG. 3 is similar to FIG. 2, but viewed from another direction.

Referring to FIG. 2 and FIG. 3, in a first preferred embodiment, the hinge mechanism 200 includes a sleeve 10, a fixed member 20, a shaft 30, two rolling elements 40, a rotational member 50, an elastic member 60, a stopping member 70 and a clip 80.

The sleeve 10 is substantially cylindrical in shape with two parallel, symmetrically opposite planar surfaces defined thereon, so that the sleeve 10 can be fixedly retained in the mobile phone 100. One end of the sleeve 10 is partially closed, and an opposite end is open. The sleeve 10 defines a hole 101 in the center of the partially closed end.

Figure 4:
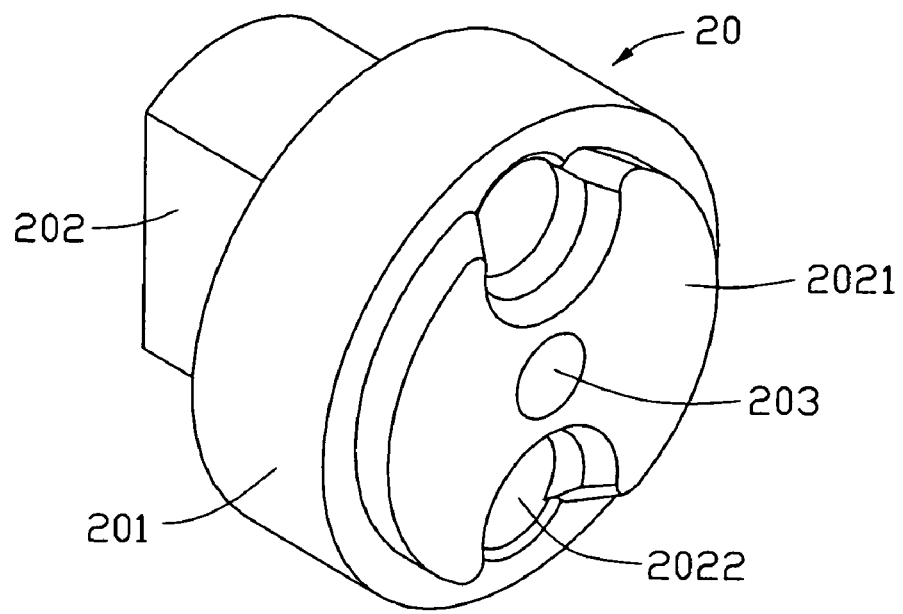
FIG. 4 is an isometric view of a fixed member of the hinge mechanism of FIG. 2.

Referring also to FIG. 4, the fixed member 20 includes a flange 201 and a stop portion 202. The flange 201 is column-shaped, and has one end connected to the stop portion 202 and a protruding portion 2021 extending from an opposite end. The stop portion 202 is a column with two parallel, symmetrically opposite planar surfaces, so that the fixed member 20 can be fixedly retained in the mobile phone 100. The protruding portion 2021 symmetrically defines two first hollows 2022. Each first hollow 2022 is approximately hemispherical in shape. A step hole 203 is defined in the center of the fixed member 20, running through the flange 201 and the stop portion 202.

The shaft 30 is a cylindrical pole, having a flange portion 301 at one end and defining an annular groove 302 in an opposite end.

Each rolling element 40 includes a cylinder-shaped pole portion 401 with one end of the pole portion 401 having a first rolling portion 402 and the opposite end having a second rolling portion 403. The rolling portions 402, 403 are approximately hemispherical in shape.

Figure 5:
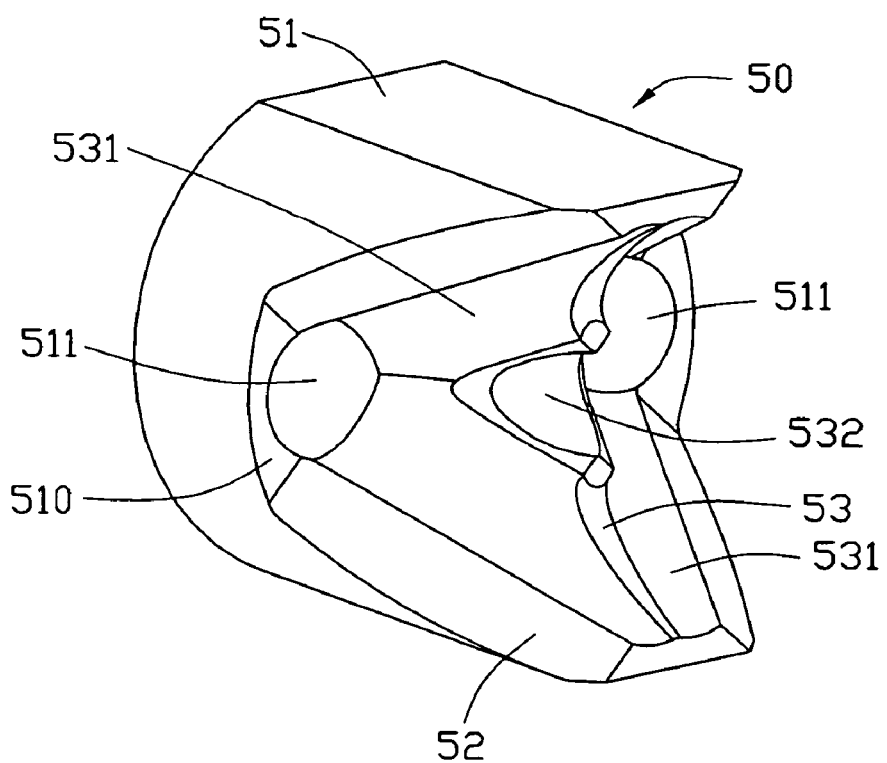
FIG. 5 is an isometric view of a rotational member of the hinge mechanism of FIG. 2.

Referring also to FIG. 5, the rotational member 50 includes a main portion 51, two extending portions 52 and a middle portion 53. The main portion 51 is approximately a column with two parallel, symmetrically opposite planar surfaces, so that the main portion 51 can be fixedly retained in the sleeve 10. The main portion 51 has an end surface 510 and two hemisphere-shaped second hollows 511 symmetrically defined in the end surface 510. A cylinder-shaped portion 512 perpendicularly extends from the center of the other end of the main portion 51 opposite to the end surface 510. The extending portions 52 are formed by perpendicularly extending part of main portion 51 from the end surface 510. The extending portions 52 are symmetrical along a line connecting the center of the second hollows 511. The middle portion 53 is located between the two extending portions 52 and connects with the two extending portions 52. Two receiving chambers 531 are slantways defined in the two sides of the middle portion 53. The second hollows 511 are at two sides of the middle portion 53. The receiving chambers 531 are half-columned and skew to each other. Each of the two receiving chambers 531 communicates with a given one of the second hollows 511. A hole 532 is defined in the center of the middle portion 53 and the hole 532 extends through main portion 51 and the cylinder-shaped portion 512.

The elastic member 60 is a spring which is helical and preferably metallic, with an inner diameter larger than a diameter of the cylinder-shaped portion 512 of the rotational member 50, and an outer diameter smaller than an inner diameter of the sleeve 10.

The stopping member 70 is column-shaped and has a stopping flange 701 at one end. An engaging portion 702 perpendicularly protrudes.

The clip 80 is generally C-shaped, and is made of an elastic material.

Figure 6:
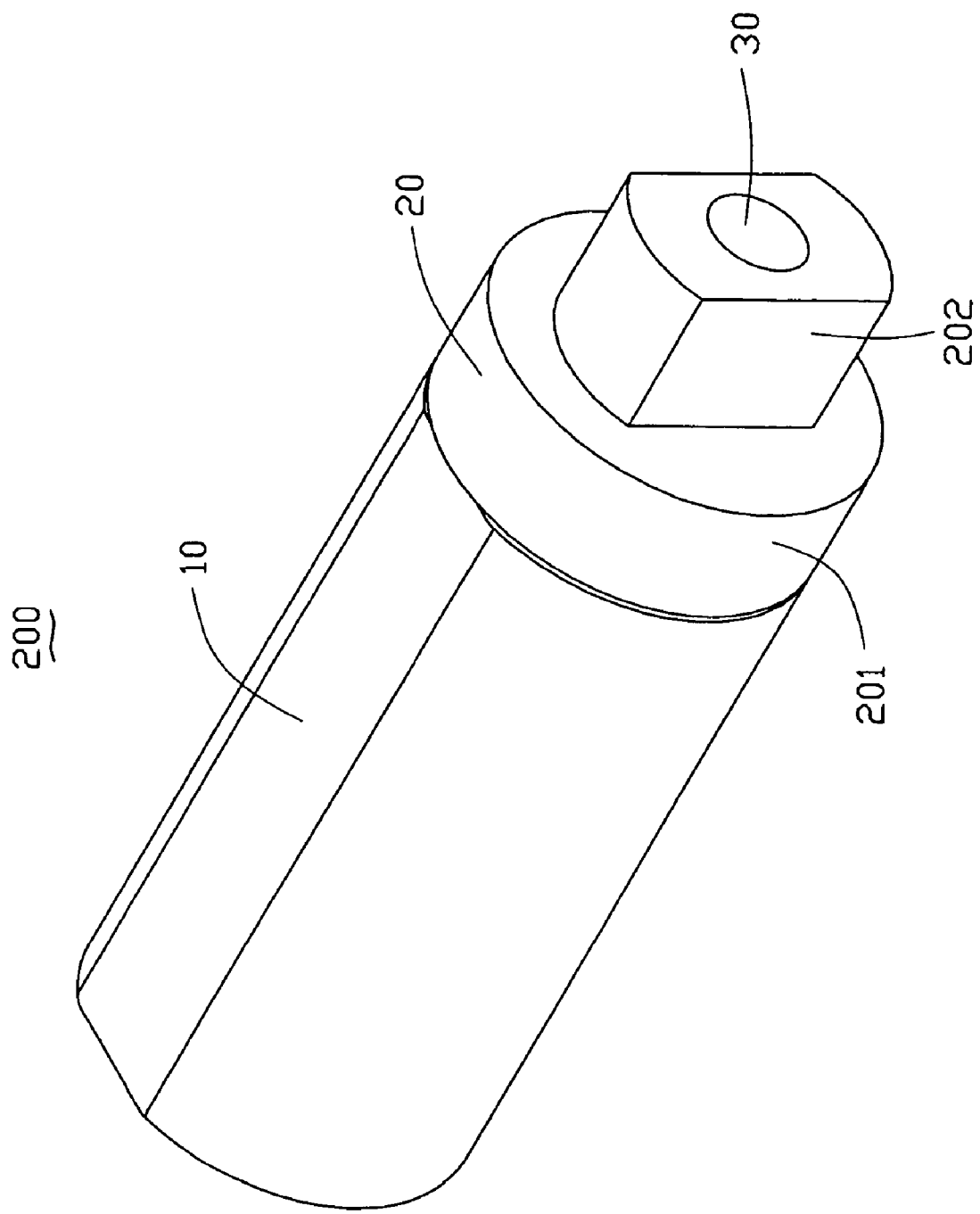
FIG. 6 is an assembled, isometric of view of the hinge assembly of FIG. 2.

Referring to FIG. 6, in assembly, one end of the shaft 30 that defines the annular groove is inserted through the step hole 203 of the fixed member 20, with the flange 301 of the shaft 30 abutting with an outer end of the stop portion 20. The two rolling elements 40 are each received in their separate receiving chambers 531 of the middle portion 53 and the second rolling portions 403 of the rolling elements 40 rest in their respective second hollows 511 of the main portion 51. The shaft 30 is then inserted through the hole 532 of the rotational member 50 and the first rolling portions 402 of the rolling elements 40 are received in the first hollows 2022 of the fixed member 20. The shaft 30 is inserted through the elastic member 60 and one end of the elastic member 60 surrounds the cylinder-shaped portion 512 of the rotational member 50. The combination of the elastic member 60, the rotational member 50, the rolling elements 40, and the shaft 30 are received in the sleeve 10. Then, the fixed member 20 is pressed so that the elastic member 60 is compressed and part of the shaft 30 extends out of the sleeve 10 via the hole 101 of the half closed end thereof. The stopping member 70 surrounds one end of the shaft 30, with the engaging portion 702 engaging with one end of the elastic member 60. The other end of the elastic member 60 resists one end of the rotational member 50. The annular groove 302 of the shaft 30 protrudes out from the stopping member 70, and the clip 80, set adjacent to the flange 701, engages with the annular groove 302 of the shaft 30. Thus, the hinge mechanism 200 is assembled to a whole.

Figure 7:
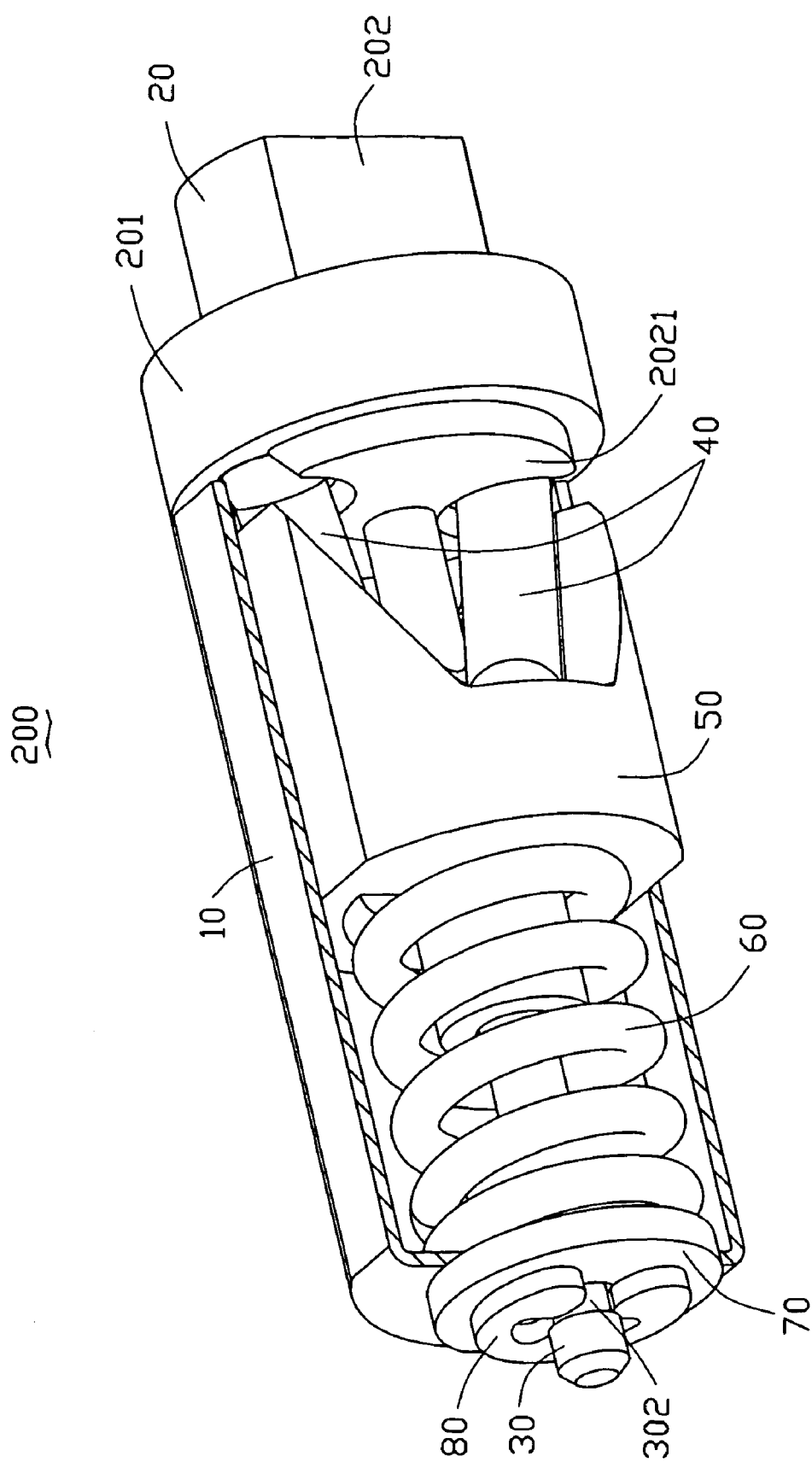
FIG. 7 is similar to FIG. 6, but showing a first state.

Referring again to FIG. 1, in use, the hinge mechanism 200 is mounted in the mobile phone 100, with the sleeve 10 engaging with the cover 1002 and the stop portion 202 of the fixed member 20 engaging with the main body 1001. The sleeve 10 can rotate together with the cover 1002 relative to the main body 1001. When the cover 1002 is closed, the hinge mechanism 200 is in a steady state (i.e. a closed state), and in such state, a line connecting the first hollows 2022 is perpendicular to a line connecting the second hollows 511 and the two rolling elements 40 are in a skewed state, as shown in FIG. 7. The elastic member 60 is in an original state.

Figure 8:
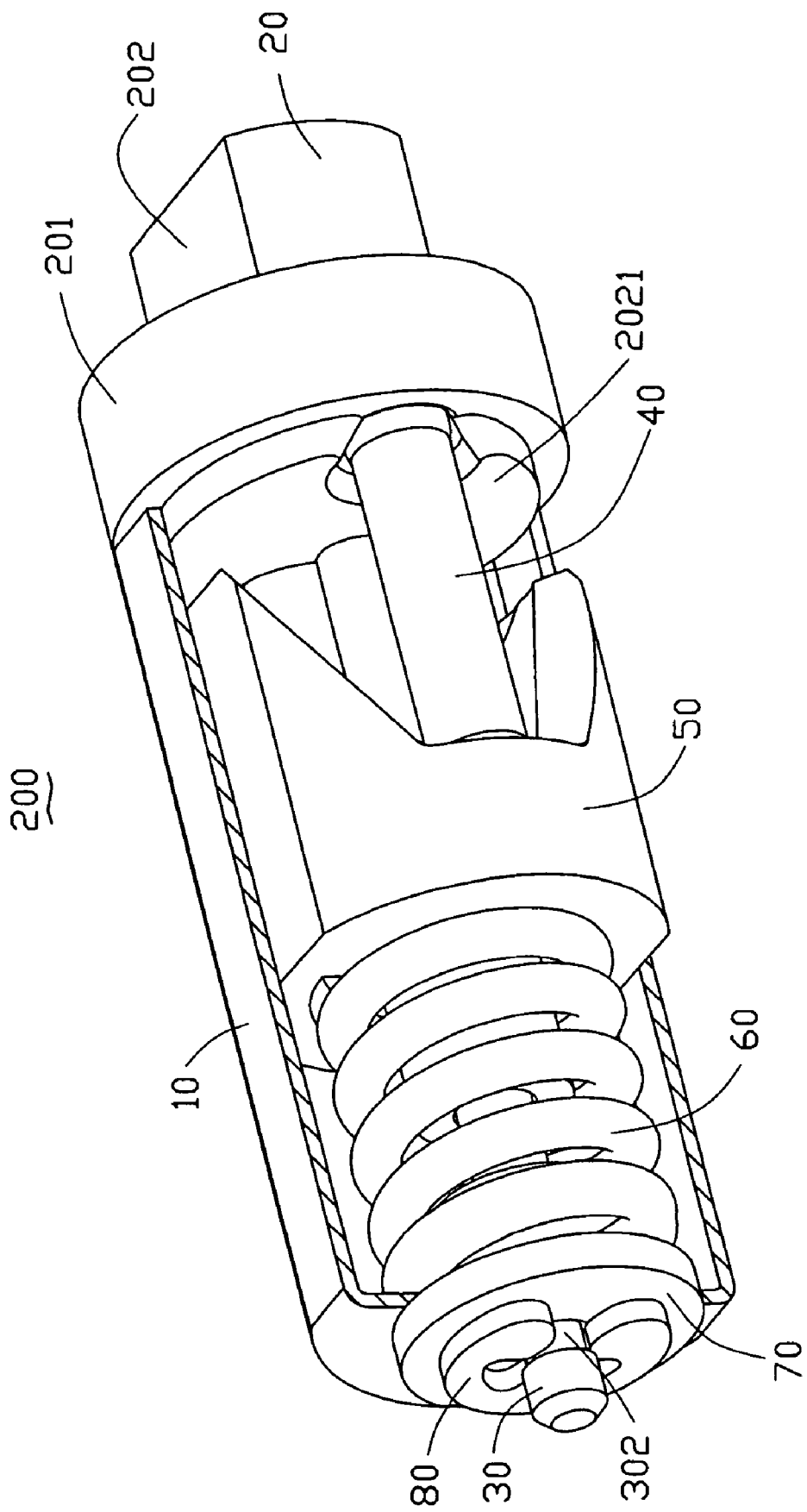
FIG. 8 is similar to FIG. 6, but showing a second state.
Figure 9:
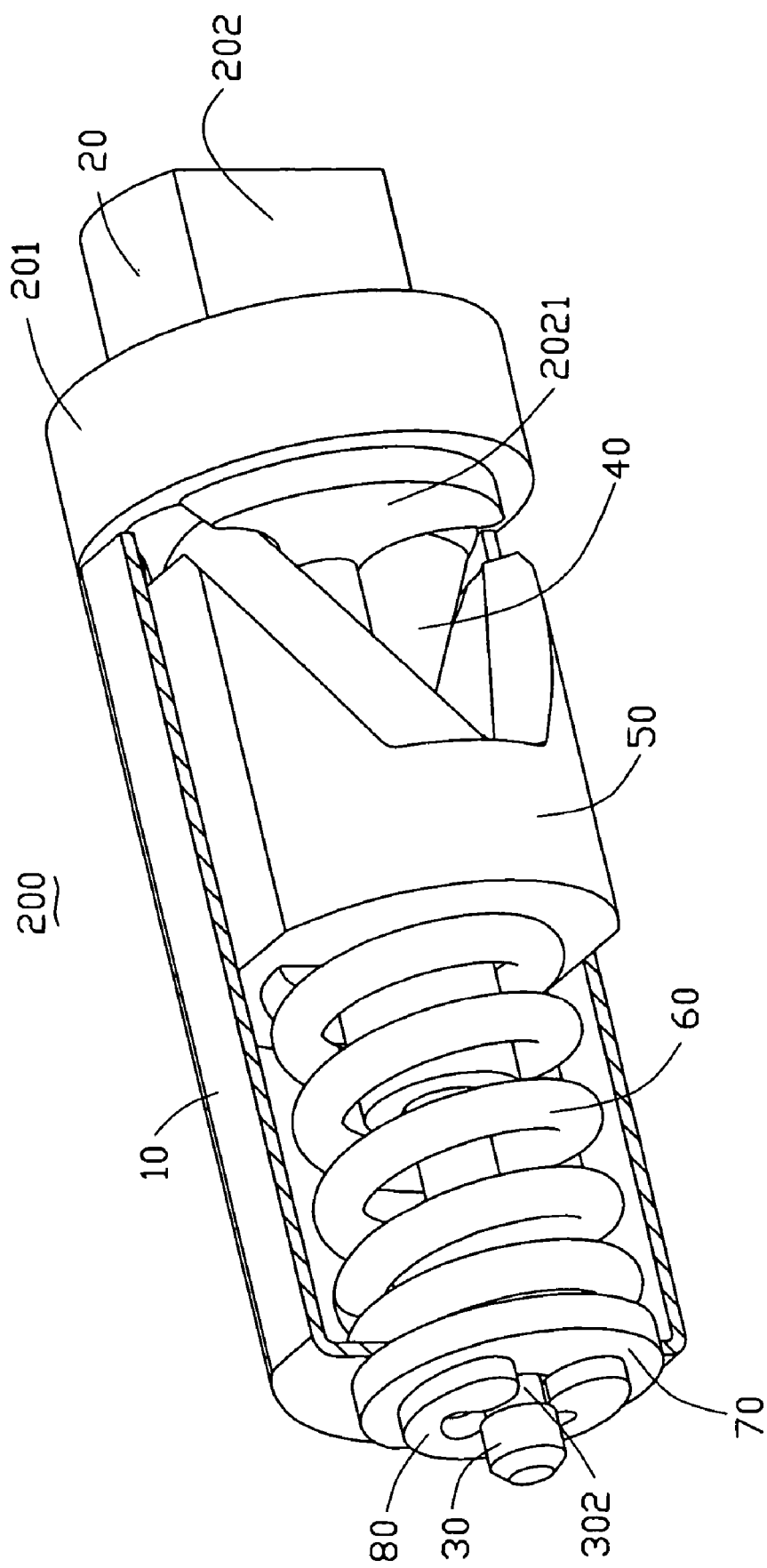
FIG. 9 is similar to FIG. 6, but showing a third state.

Referring to FIG. 8 and FIG. 9, when opening the cover 1002, the sleeve 10 and the rotational member 50 do not rotate in the cover 1002, but can rotate together with the cover 1002 relative to the fixed member 20. In the rotational process, the position of each rolling element 40 is gradually changed so that a length of the rolling element 40 along the axis of the hinge mechanism 200 is gradually increased and the elastic member 60 is gradually compressed, meanwhile, the first rolling portions 402 at one end of the rolling elements 40 rotate in the first hollows 2022 and the second rolling portions 403 rotate in the second hollows 511. When the cover 1002 rotates to 90°, the line connecting the two first hollows 2022 is parallel to the line connecting the second hollows 511 and the elastic member 60 is compressed to its shortest extent. When the cover 1002 rotates to an angle larger than 90°, the direction of each rolling element 40 is gradually changed due to the bounce of the elastic member 60 so that the length of the rolling element 40 along the axis of the hinge mechanism 200 is gradually reduced. When the cover 1002 rotates to its maximum angle, for example 180°, the line connecting the two first hollows 2022 is perpendicular again to the line connecting the second hollows 511 and the two rolling elements 40 return to the skewed state, the elastic member 60 returns to the original state, and the cover 1002 is in another steady state (i.e., a fully open state). The process of closing the cover 1002 is substantially the reverse of the above-described opening process but performed in the same manner.

In alternative embodiment, if the largest open angle of the cover 1002 is not 180°, it should only change the relative positions of the two first hollows 2022 and that of the two second hollows 511. The sleeve 10 and the stopping member 70 can be omitted. The hinge mechanism 200 can include only one first hollow 2022, one second hollow 511, one rolling element 40 and one receiving chamber 531. The middle portion 53 can also be omitted and then the receiving chamber 531 can be defined in the main portion 51 or in the extending portion 52. The sleeve 10 and the stop portion 202 can be of other shapes. The clip 50, engaging with the annular groove 302, can be replaced by other structures for stopping the stopping member 70 from falling off one end of the shaft 30 such as a nut. The fixed member 20 and the shaft 30 can be manufactured to a whole, thus, the step hole 203 of the fixed member 20 and the flange 301 of the shaft 30 can be omitted. In addition, the sleeve 10 can engage with the body 1001 and the stop portion 202 of the fixed member 20 can engage with the main cover 1002.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge mechanism comprising:
a fixed member defining two first hollows;
two rolling bodies, each having two rolling portions;
a rotational member, having a main portion defining two second hollows, and a middle portion defining two receiving chambers therein for receiving the rolling bodies;
an elastic member; and
a shaft extending through the fixed member, the elastic member and the rotational member;
wherein the rolling portions of each rolling element are respectively received in one given first hollow and one given second hollow, the rotational member is rotatable relative to the fixed member, one end of the elastic member resists the rotational member and the other end of the elastic member is fixed in the longitudinal direction of the shaft.

2. The hinge mechanism as claimed in claim 1, wherein the hinge mechanism further comprises a sleeve, the rolling bodies, the rotational member and the shaft are received in the sleeve, and part of the shaft extends out of the sleeve, and the sleeve is a cylinder with two parallel, symmetrically opposite planar surfaces.

3. The hinge mechanism as claimed in claim 1, wherein the first hollow and the second hollow are hemispherical in shape, each rolling element comprises a pole portion connecting with the rolling portions at the two ends thereof and the rolling portion is hemispherical in shape.

4. The hinge mechanism as claimed in claim 1, wherein the two receiving chambers are slantways defined in the two sides of the middle portion and the receiving chambers are half-columned and askew with respect to each other, the main portion has an end portion and the two hemispherical in shape second hollows are symmetrically defined in the end surface, and a cylinder-shaped portion perpendicularly extends from the center of another end opposite to the end surface.

5. The hinge mechanism as claimed in claim 4, wherein two extending portions are formed by perpendicularly extending part of main portion from the end surface, the middle portion is located between the two extending portions and connects with the two extending portions, the two second hollows are separated by the middle portion so that each second hollow is on one side of the middle portion.

6. The hinge mechanism as claimed in claim 5, wherein a hole is defined in the center of the middle portion, and the hole extends through main portion and the cylinder-shaped portion, the shaft extends through the hole.

7. The hinge mechanism as claimed in claim 1, wherein the hinge mechanism further includes a stopping member, the stopping member is column-shaped and has a stopping flange at one end, with an engaging portion perpendicularly protruding along the axis of the stopping flange.

8. The hinge mechanism as claimed in claim 1, wherein the shaft is a cylinder pole, having a flange portion at one end and defining a groove in the other end, the hinge mechanism further includes a clip, set adjacent to the flange, engaging with the groove of the shaft, the clip is C-shaped, and is made of an elastic material.

9. A hinge mechanism configured for pivotably joining a flip cover and a main body of an electronic device, the hinge mechanism comprising:
a fixed member configured so as to be fixed relative to one of the flip cover and the main body, the fixed member having a first hole defined therein;
a rotational member configured so as to be fixed relative to the other of the flip cover and the main body, the rotational member having a second hole defined therethrough;
a shaft extending through the second hole of the rotational member and engaging in the first hole of the fixed member in a manner such that the rotational member is rotatable with respect to the fixed member;
a first rolling element including a pole portion with opposite first and second rolling portions, the first rolling portion being securely engaged with the fixing member, the second rolling portion being engaging with the rotational member in such a manner that the second rolling portion slides along the rotational member as the rotational member rotates relative to the fixing member; and
an elastic member biasing the rotational member against the fixed member.

10. The hinge mechanism as claimed in claim 9, wherein the fixed member has a first surface, the rotational member has a second surface facing the first surface, the first surface has a first hollow defined therein, the second surface has a second hollow defined therein, the first and second rolling portions engage in the first and second hollows.

11. The hinge mechanism as claimed in claim 10, further comprising a second rolling element of a configuration the same as that of the first rolling element, the first surface has another first hollow, and the second surface has another second hollow, the second rolling element engaging between the another first hollow and the another second hollow.

12. The hinge mechanism as claimed in claim 11, wherein the rotational member comprises a main portion, a pair of extending portions projecting from the main portion toward the fixed member, and a middle portion connected between the extending portions, and the two second hollows are located respectively at opposite two sides of the middle portion, and each of the first and second hollow is substantially hemispherical in shape.

13. The hinge mechanism as claimed in claim 9, further comprising a sleeve, wherein the rotational member, the elastic member, the shaft, the rolling element are received in the sleeve so as to form a module.

14. The hinge mechanism as claimed in claim 9, wherein the hinge mechanism further comprises a sleeve, and one end of the sleeve is partially closed, and the other end is open for receiving the rolling element, the rotational member and the shaft, and wherein part of the shaft extends out of the sleeve from the partially closed end.

15. The hinge mechanism as claimed in claim 9, wherein the first hollow and the second hollow are hemispherical in shape, the rolling element comprises a pole portion connecting with the rolling portions at the two ends thereof and the rolling portion is hemispherical in shape.

16. The hinge mechanism as claimed in claim 9, wherein the shaft is a cylinder pole, defining a groove in one end, the hinge mechanism further includes a clip, set adjacent to the flange, and engaging with the groove of the shaft.

17. A foldable electronic device comprises:
a main body;
a flip cover; and
a hinge mechanism pivotally connecting the main body and the flip cover, the hinge mechanism comprising:
a fixed member fixed relative to one of the flip cover and the main body, the fixed member having a first hole defined therein;
a rotational member fixed relative to the other of the flip cover and the main body, the rotational member having a second hole defined therethrough;

a shaft extending through the second hole of the rotational member and engaging in the first hole of the fixed member in a manner such that the rotational member is rotatable with respect to the fixed member;

a first rolling element including a pole portion with opposite first and second rolling portions, the first rolling portion being securely engaged with the fixing member, the second rolling portion being engaging with the rotational member in such a manner that the second rolling portion slides along the rotational member as the rotational member rotates relative to the fixing member; and an elastic member biasing the rotational member against the fixed member.

18. The hinge mechanism as claimed in claim 17, wherein the fixed member has a first surface, the rotational member has a second surface facing the first surface, the first surface has a first hollow defined therein, the second surface has a second hollow defined therein, the first and second rolling portions engage in the first and second hollows.

19. The hinge mechanism as claimed in claim 18, further comprising a second rolling element of a configuration the same as that of the first rolling element, the first surface has another first hollow, and the second surface has another second hollow, the second rolling element engaging between the another first hollow and the another second hollow.

20. The hinge mechanism as claimed in claim 19, wherein the rotational member comprises a main portion, a pair of extending portions projecting from the main portion toward the fixed member, and a middle portion connected between the extending portions, and the two second hollows are located respectively at opposite two sides of the middle portion.

* * * * *